(12) United States Patent
Chang

(10) Patent No.: US 6,295,698 B1
(45) Date of Patent: Oct. 2, 2001

(54) RETRACTABLE HANDLE

(76) Inventor: Wen-Chen Chang, 58, Ma Yuan West St., Taichung (TW)

(\*) Notice: Subject to any disclaimer, the term of this patent is extended or adjusted under 35 U.S.C. 154(b) by 0 days.

(21) Appl. No.: 09/471,734

(22) Filed: Dec. 23, 1999

(51) Int. Cl.[7] ................. B62B 7/00; A45C 7/00; B25G 1/04
(52) U.S. Cl. ............. 16/113.1; 280/655; 190/115
(58) Field of Search ............. 16/113.1; 280/655, 280/655.1, 47.315, 47.371; 190/115

(56) References Cited

U.S. PATENT DOCUMENTS

| | | | |
|---|---|---|---|
| 5,502,876 | * | 4/1996 | Wang ................. 16/113.1 |
| 5,727,898 | * | 3/1998 | Lu ..................... 16/113.1 |
| 5,729,866 | * | 3/1998 | Chg .................... 16/113.1 |
| 5,996,177 | * | 12/1999 | Cheng .................. 16/113.1 |
| 6,026,543 | * | 2/2000 | Chen ................... 16/113.1 |
| 6,141,828 | * | 11/2000 | Kuo .................... 16/113.1 |

\* cited by examiner

*Primary Examiner*—Chuck Y. Mah

(57) ABSTRACT

A retractable handle assembly has a grip device, a push button, a U-shaped rod, a driven rod, an inner pipe, a middle pipe, an outer pipe, an upper seat, a lower seat, and a first and a second positioning devices. The upper seat has two downward sleeves and two oblong apertures. The lower seat has two upward sleeves and two oblong holes. The push button encloses a center portion of the U-shaped rod. The grip device has a first grip casing and a second grip casing. The U-shaped rod is disposed in the grip device. The U-shaped rod has two end portions. An upper end of the driven rod engages with the respective end portion of the U-shaped rod. The driven rod is inserted in the inner pipe. The inner pipe is inserted in the outer pipe. The first positioning device is disposed on a bottom of the inner pipe. The second positioning device is disposed on a bottom of the middle pipe.

1 Claim, 5 Drawing Sheets

RETRACTABLE HANDLE

BACKGROUND OF THE INVENTION

The present invention relates to a retractable handle assembly. More particularly, the present invention relates to a retractable handle assembly for a suitcase.

A conventional handle device of a suitcase can be extended or retracted according to the operation of the user. The conventional handle device is inserted in the suitcase. However, a retractable mechanism of the conventional handle device may be broken easily. U.S. Pat. No. 5,500,981 has disclosed a handle device of a suitcase.

SUMMARY OF THE INVENTION

An object of the present invention is to provide a retractable handle assembly which can be operated easily.

Another object of the present invention is to provide a retractable handle assembly which can be assembled easily.

Another object of the present invention is to provide a retractable handle assembly which has a positioning device to be moved silently.

Accordingly, a retractable handle assembly comprises a grip device, a push button, a U-shaped rod, a driven rod, an inner pipe, a middle pipe, an outer pipe, an upper seat, a lower seat, and a first and a second positioning devices. The upper seat has two downward sleeves and two oblong apertures. One of the downward sleeves receives an upper end of the outer pipe. The lower seat has two upward sleeves and two oblong holes. One of the upward sleeves receives a lower end of the outer pipe. The push button encloses a center portion of the U-shaped rod. The grip device has a first grip casing and a second grip casing engaging with the first grip casing. The U-shaped rod is disposed in the grip device. A coiled spring is disposed on a bottom of the push button. The U-shaped rod has two end portions. An upper end of the driven rod engages with the respective end portion of the U-shaped rod. The outer pipe has an oblong slot. The driven rod is inserted in the inner pipe. The inner pipe is inserted in the middle pipe. The middle pipe is inserted in the outer pipe. An upper end of the inner pipe is inserted in the grip device. The middle pipe passes through the respective oblong aperture of the upper seat. The first positioning device is disposed on a bottom of the inner pipe. The second positioning device is disposed on a bottom of the middle pipe. Each of the first and the second positioning devices has a mount, a cover plate engaging with the mount, a hollow brake block, and a positioning block. The mount has a bottom recess, a guide groove, two lateral click blocks, and a positioning groove. Each of the lateral click blocks has an upper camber edge. The hollow brake block has two bevel grooves. The positioning block has two lateral posts. The cover plate has a lower click hook and two lateral click grooves matching the lateral click blocks. The hollow brake block is inserted in the guide groove of the mount. A compression spring is disposed on a bottom of the hollow brake block. The positioning block is inserted in the positioning groove of the mount. The lateral posts are inserted in the bevel groove of the hollow brake block. The lower click hook is inserted in the bottom recess of the mount. The lateral click blocks are inserted in the lateral click grooves.

DETAILED DESCRIPTION OF THE INVENTION

Figure 1:
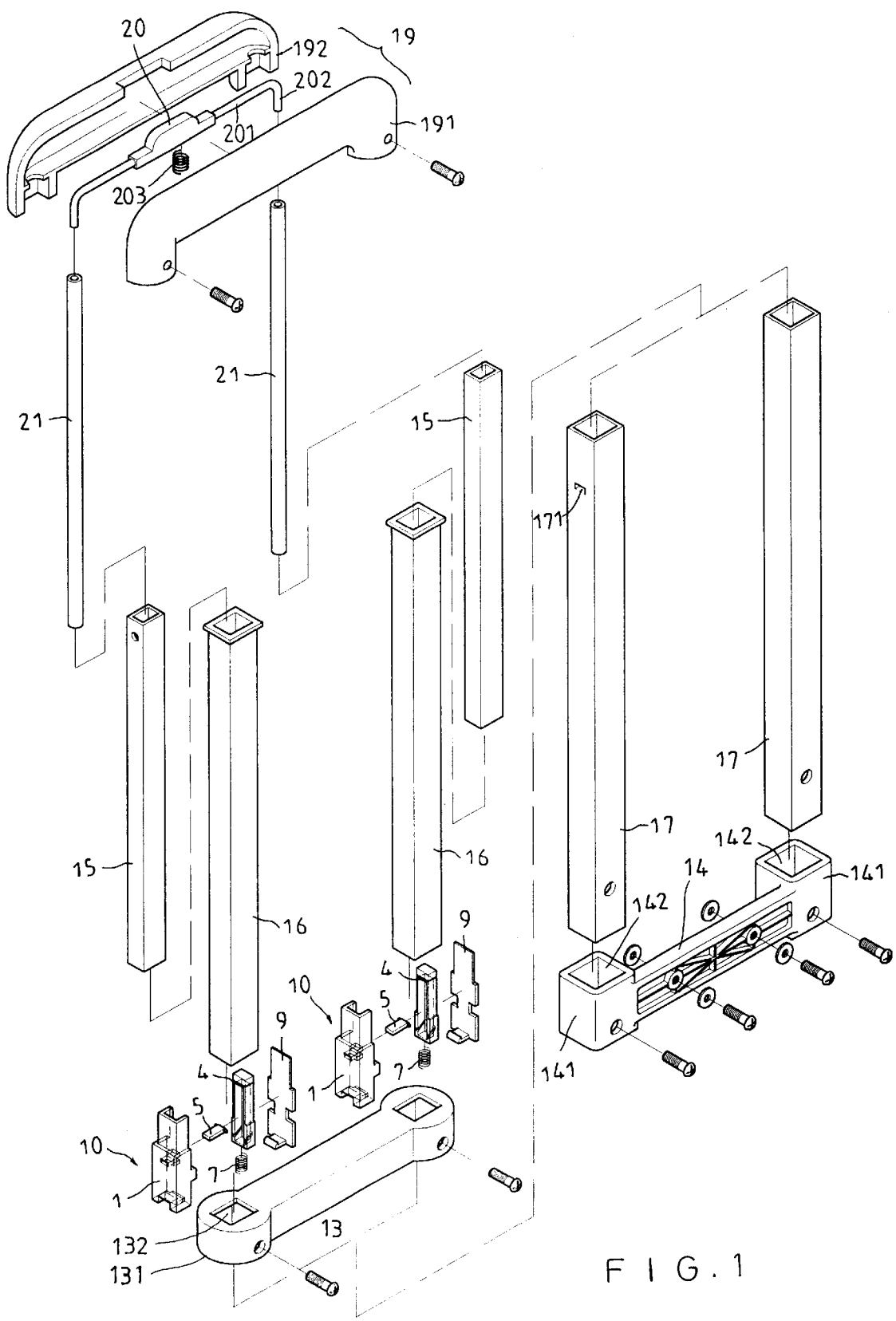
FIG. 1 is a perspective exploded view of a retractable handle assembly of a preferred embodiment in accordance with the present invention.
Figure 2:
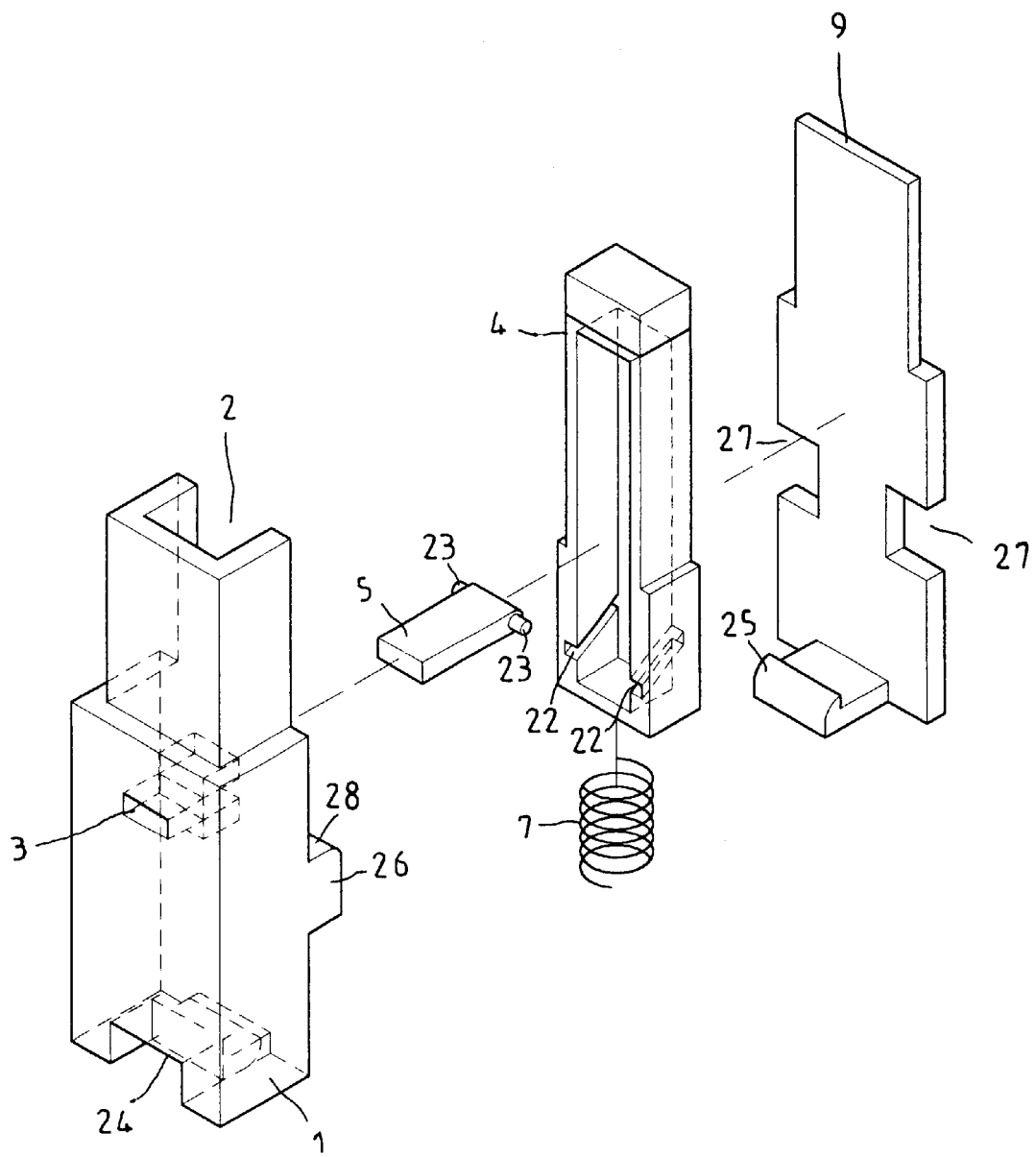
FIG. 2 is a perspective exploded view of a positioning device of a preferred embodiment in accordance with the present invention.
Figure 3:
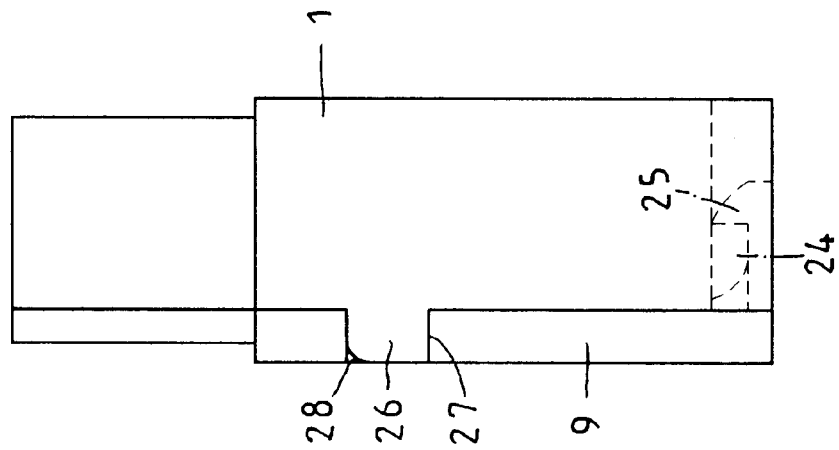
FIG. 3 is an elevational assembly view of a positioning device of a preferred embodiment in accordance with the present invention.

Referring to FIGS. 1 to 3, a retractable handle assembly comprises a grip device 19, a push button 20, a U-shaped rod 201, a driven rod 21, an inner pipe 15, a middle pipe 16, an outer pipe 17, an upper seat 13, a lower seat 14, and a first and a second positioning devices 10.

The upper seat 13 has two downward sleeves 131 and two oblong apertures 132. One of the downward sleeves 131 receives an upper end of the outer pipe 17.

The lower seat 14 has two upward sleeves 141 and two oblong holes 142. One of the upward sleeves 141 receives a lower end of the outer pipe 17.

The push button 20 encloses a center portion of the U-shaped rod 201.

The grip device 19 has a first grip casing 191 and a second grip casing 192 engaging with the first grip casing 191.

The U-shaped rod 201 is disposed in the grip device 19.

A coiled spring 203 is disposed on a bottom of the push button 20.

The U-shaped rod 201 has two end portions 202. An upper end of the driven rod 21 engages with the respective end portion 202 of the U-shaped rod 201. The outer pipe 17 has an oblong slot 171.

The driven rod 21 is inserted in the inner pipe 15. The inner pipe 15 is inserted in the middle pipe 16. The middle pipe 16 is inserted in the outer pipe 17.

An upper end of the inner pipe 15 is inserted in the grip device 19.

The middle pipe 16 passes through the respective oblong aperture 132 of the upper seat 13.

The first positioning device 10 is disposed on a bottom of the inner pipe 15.

The second positioning device 10 is disposed on a bottom of the middle pipe 16.

Each of the first and the second positioning devices 10 has a mount 1, a cover plate 9 engaging with the mount 1, a hollow brake block 4, and a positioning block 5.

The mount 1 has a bottom recess 24, a guide groove 2, two lateral click blocks 26, and a positioning groove 3.

Each of the lateral click blocks 26 has an upper camber edge 28. The hollow brake block 4 has two bevel grooves 22. The positioning block 5 has two lateral posts 23. The cover plate 9 has a lower click hook 25 and two lateral click grooves 27 matching the lateral click blocks 26.

The hollow brake block 4 is inserted in the guide groove 2 of the mount 1. A compression spring 7 is disposed on a bottom of the hollow brake block 4.

The positioning block 5 is inserted in the positioning groove 3 of the mount 1.

The lateral posts 23 are inserted in the bevel groove 22 of the hollow brake block 4.

The lower click hook 25 is inserted in the bottom recess 24 of the mount 1.

Figure 4:
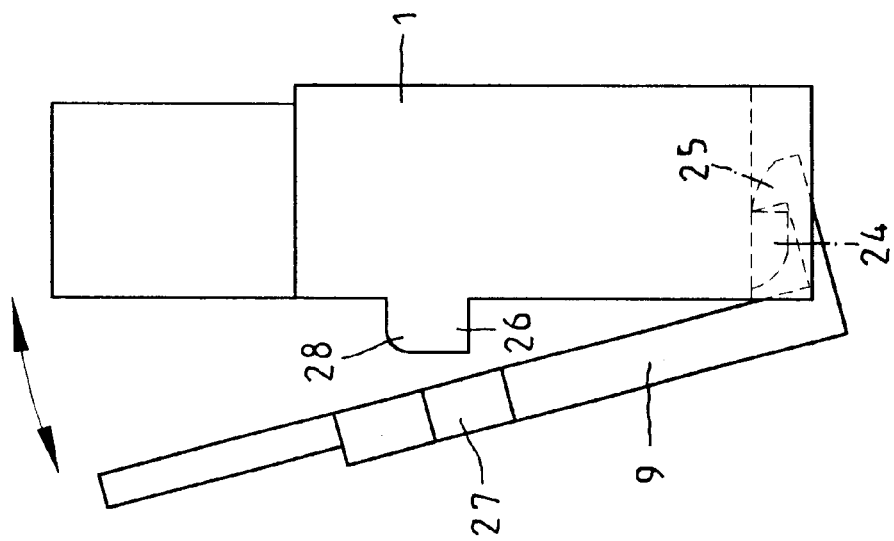
FIG. 4 is an elevational schematic view illustrating an operation of a positioning device of a preferred embodiment in accordance with the present invention.

Referring to FIG. 4, the lower click hook 25 is inserted in the bottom recess 24 of the mount 1 first and the lateral click blocks 26 are inserted in the lateral click grooves 27 later.

Figure 6:
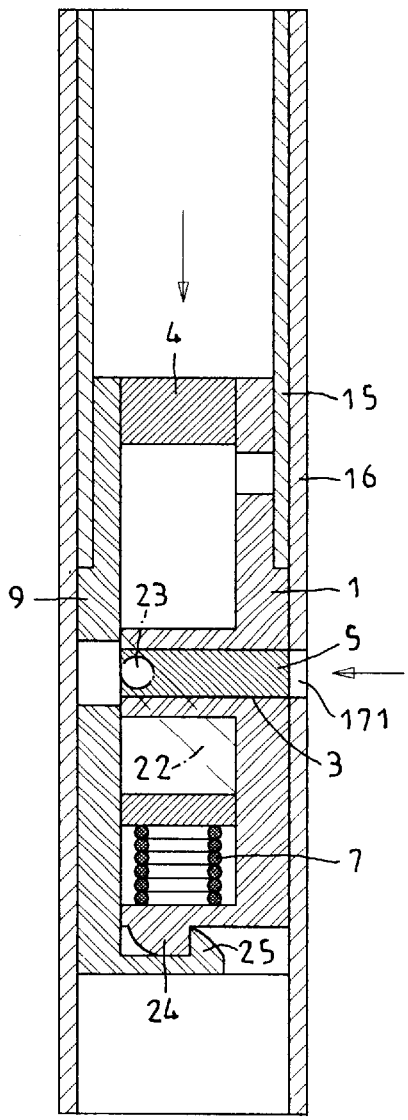
FIG. 6 is a second sectional schematic view illustrating an operation of a positioning device of a preferred embodiment in accordance with the present invention.

Referring to FIG. 6, the hollow brake block 4 will move downward while the push button 20 is pushed downward.

Figure 5:
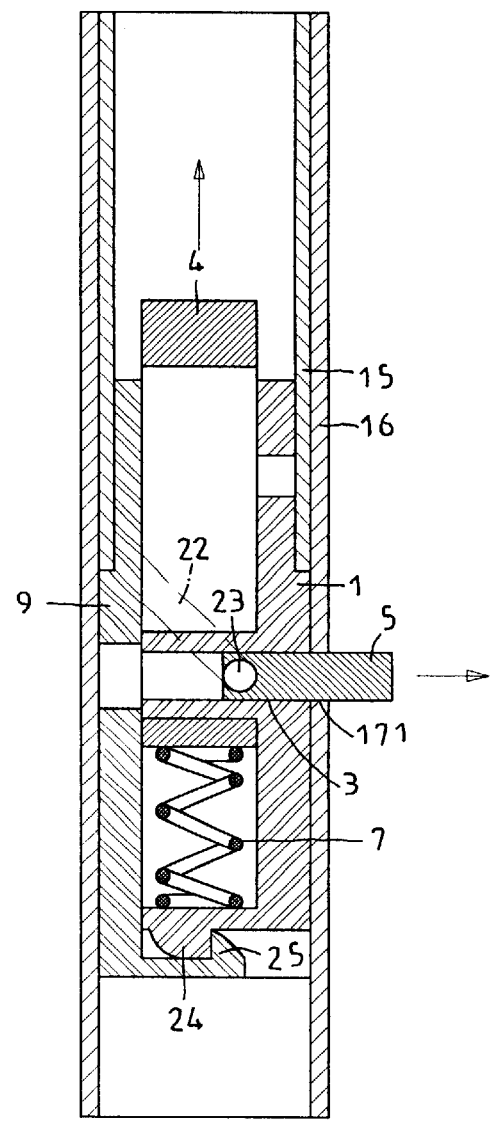
FIG. 5 is a first sectional schematic view illustrating an operation of a positioning device of a preferred embodiment in accordance with the present invention.

Referring to FIG. 5, the hollow brake block 4 will move upward while the push button 20 is released until the positioning block 5 is inserted in the oblong slot 171 of the outer pipe 17.

Figure 7:
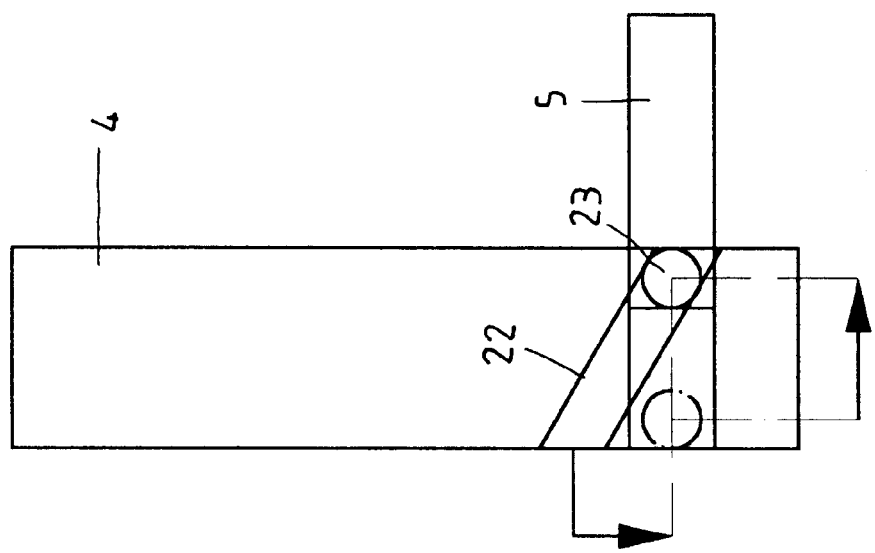
FIG. 7 is a first schematic view illustrating a variation of a slope of a positioning block of a preferred embodiment in accordance with the present invention.
Figure 8:
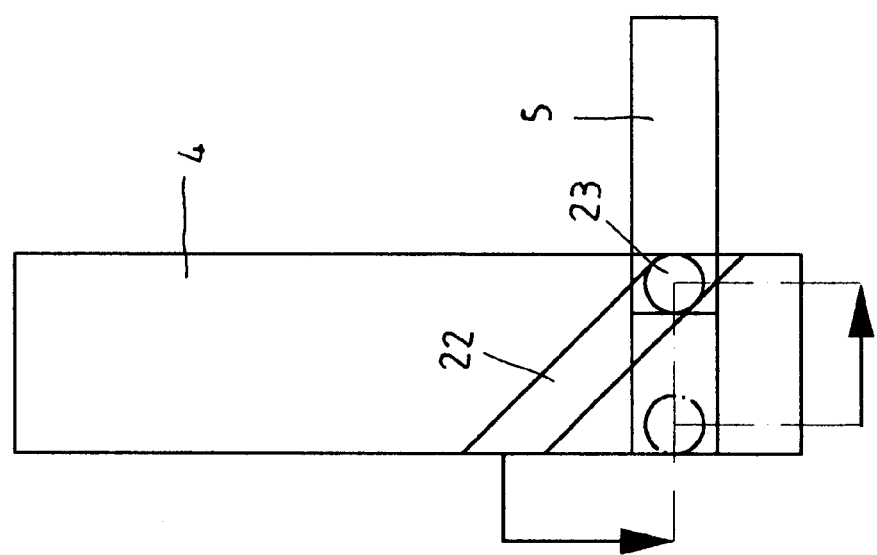
FIG. 8 is a second schematic view illustrating a variation of a slope of a positioning block of a preferred embodiment in accordance with the present invention.

Referring to FIGS. 7 and 8, a variation of a slope of the positioning block 5 is illustrated.

The present invention is not limited to the above embodiments but various modification thereof may be made. Furthermore, various changes in form and detail may be made without departing from the scope of the present invention.

I claim:

1. A retractable handle assembly comprising:

a grip device, a push button, a U-shaped rod, two driven rods, two inner pipes, two middle pipes, two outer pipes, an upper seat, a lower seat, and a first and a second positioning devices, the upper seat having two downward sleeves and two oblong apertures, each of the downward sleeves receiving an upper end of one of the outer pipes, the lower seat having two upward sleeves and two oblong holes, each of the upward sleeves receiving a lower end of one of the outer pipes, the push button enclosing a center portion of the U-shaped rod, the grip device having a first grip casing and a second grip casing engaging with the first grip casing, the U-shaped rod disposed in the grip device, a coiled spring disposed on a bottom of the push button, the U-shaped rod having two end portions, an upper end of each said driven rod engaging with the respective end portion of the U-shaped rod, each said driven rod inserted in the inner pipe, each said inner pipe inserted in the middle pipe, each said middle pipe inserted in the outer pipe, an upper end of each said inner pipe inserted in the grip device, each said middle pipe passing through the respective oblong aperture of the upper seat, the first positioning device disposed on a bottom of the inner pipe, the second positioning device disposed on a bottom of the middle pipe, each of the first and the second positioning devices having a mount, a cover plate engaging with the mount, a hollow brake block disposed between the mount and the cover plate, and a positioning block, the mount having a bottom recess, a guide groove, two lateral click blocks, and a positioning groove, each of the lateral click blocks having an upper camber edge, the hollow brake block having two bevel grooves, the positioning block having two lateral posts, the cover plate having a lower click hook and two lateral click grooves matching the lateral click blocks, the hollow brake block inserted in the guide groove of the mount, a compression spring disposed on a bottom of the hollow brake block, the positioning block inserted in the positioning groove of the mount, the lateral posts inserted in the bevel groove of the hollow brake block, the lower click hook inserted in the bottom recess of the mount, and the lateral click blocks inserted in the lateral click grooves.

\* \* \* \* \*